(12) United States Patent  (10) Patent No.: US 7,387,647 B2
Huang et al.  (45) Date of Patent: Jun. 17, 2008

(54) DYE COMPOSITION AND THE USE THEREOF

(75) Inventors: Huei-Chin Huang, Taoyuan (TW); Sheena Lee, Taoyuan (TW); Sheue-Rong Lee, Bade (TW); Bao-Kun Lai, Dayuan Shiang (TW); Cheng-Hsiang Hsu, Taipei (TW); Ya-Chi Tseng, Pingjen (TW)

(73) Assignee: Everlight USA, Inc., Pineville, NC (US)

( * ) Notice: Subject to any disclaimer, the term of this patent is extended or adjusted under 35 U.S.C. 154(b) by 433 days.

(21) Appl. No.: 11/136,586

(22) Filed: May 25, 2005

(65) Prior Publication Data

US 2006/0112504 A1 Jun. 1, 2006

(30) Foreign Application Priority Data

Nov. 29, 2004 (CN) .................... 2004 1 0097354

(51) Int. Cl.
*C09B 62/01* (2006.01)

(52) U.S. Cl. .................... 8/641; 8/669; 8/673; 8/681; 8/687

(58) Field of Classification Search ............ 8/641, 8/669, 673, 681, 687
See application file for complete search history.

(56) References Cited

U.S. PATENT DOCUMENTS 5,780,602 A * 7/1998 Schumacher et al. ....... 534/642
6,790,411 B1 * 9/2004 Read ........................... 422/28

* cited by examiner

*Primary Examiner*—Lorna M. Douyon
*Assistant Examiner*—Amina Khan
(74) *Attorney, Agent, or Firm*—Bacon & Thomas, PLLC

(57) ABSTRACT

A dye composition, comprising (A) at least one disazo dye selected from the formula (I) or (II),

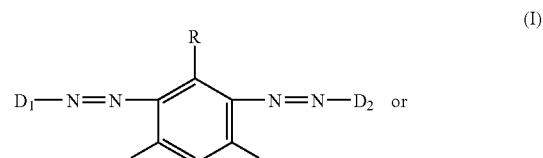

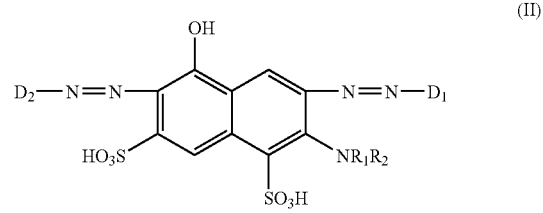

wherein R, $R_1$, $R_2$, $D_1$ and $D_2$ are defined as in the specification; and (B) a diazo dye of the formula (III),

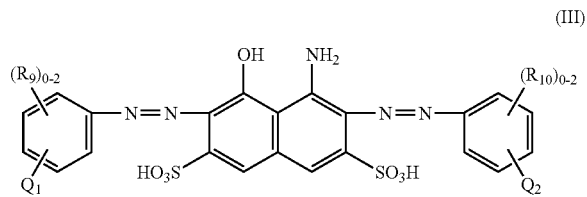

wherein $(R_9)_{0-2}$, $(R_{10})_{0-2}$, $Q_1$ and $Q_2$ are defined as in the specification. These dye compositions have high fixation and good build-up. They are distinguished also by high washing off and low nylon staining and they are suitable for dyeing and printing of materials containing either cellulose fibers, such as cotton, artificial cotton, linen, and artificial linen, or polyamide fibers, such as wool, silk, and nylon etc. Dyed materials with excellent properties can be obtained, showing especially outstanding performance in washing off, levelness, build-up, wet fastness and light fastness.

19 Claims, No Drawings

DYE COMPOSITION AND THE USE THEREOF

BACKGROUND OF THE INVENTION

1. Field of the Invention

The present invention relates to dye compositions, and more particularly to black or navy blue reactive dye compositions.

2. Description of Related Art

The reactive dyestuffs are used for dyeing or printing cellulose fibers or cellulose containing fibers particularly need for high quality such as the properties of leveling, reproducibility, solubility, fastness etc.

Current market dyeing with reactive dyestuff is much related to the product quality as well as economical dyeing techniques. However, the conventional reactive dye stuffs are short of good build-up and easy wash-off properties as well as low nylon stain. Therefore, to improve dyeing properties of dye stuffs, particularly novel reactive dyestuffs that are applicable for the industrial use is demanding.

A novel dye composition with high build-up, and excellent fixation with cellulose as well as able to easily wash off the unfixed dyes is needed.

SUMMARY OF THE INVENTION

The present invention provides a dye composition comprising of components (A) a disazo dye and (B) a disazo dye.

In the dye composition of the present invention, the weight percentage of component (A) ranges from 1-99% and at least on e disazo dye is selected from the group consisting of the following formula (I) and (II),

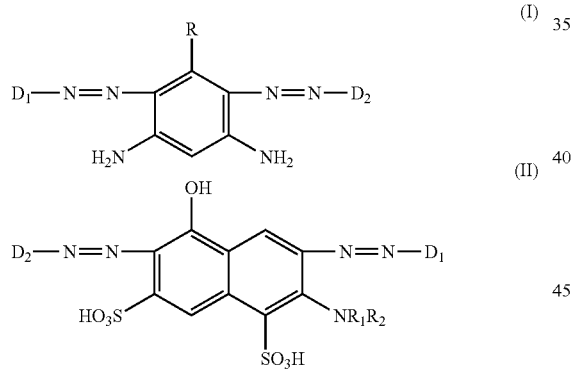

wherein

R is hydrogen or carboxyl; preferably R is carboxyl;

$R_1$ and $R_2$ are each independently of one another denotes hydrogen or $C_{1-4}$ alkyl; preferably $R_1$ and $R_2$ is hydrogen;

$D_1$ and $D_2$ are each independently can be any group selected from the group consisting of the following formula (1a), (1b), (1c), (1d) and (1e), preferably, $D_1$ and $D_2$ are the groups of formula (1a) or (1c);

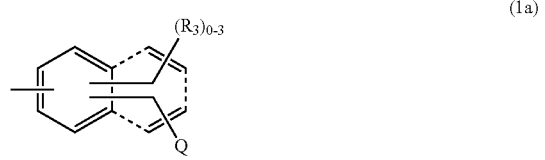

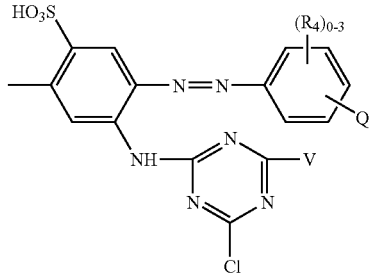

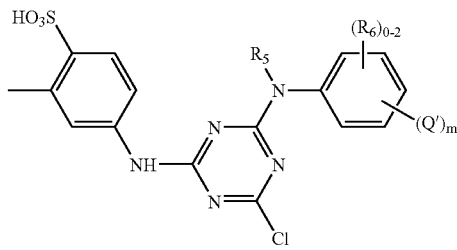

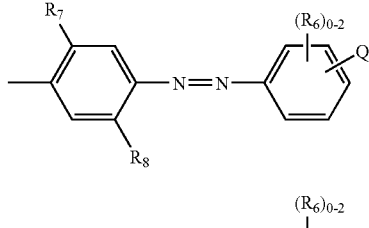

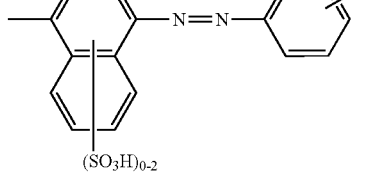

wherein $(R_3)_{0\sim3}$ and $(R_4)_{0\sim3}$ are each independently of one another 0 to 3 identical or different radicals selected from the group consisting of halogen, carboxyl, sulfo, $C_{1-4}$ alkyl and $C_{1-4}$ alkoxyl; preferably, $(R_3)_{0\sim3}$ and $(R_4)_{0\sim3}$ are 0 to 3 identical or different groups selected from sulfo, methyl and methoxy;

$R_5$ is hydrogen or $C_{1-4}$ alkyl which is unsubstituted or substituted by hydroxyl, sulfo, carboxyl or cyano; preferably, $R_5$ is hydrogen, methyl or ethyl;

$(R_6)_{0\sim2}$ is 0 to 2 identical or different radicals selected from the group consisting of sulfo, $C_{1-4}$ alkyl and $C_{1-4}$ alkoxyl; preferably, $(R_6)_{0\sim2}$ is 0 to 2 identical or different groups selected from sulfo, methyl and methoxy;

$R_7$ is hydrogen, sulfo, $C_{1-4}$ alkyl or $C_{1-4}$ alkoxyl; preferably, $R_7$ is hydrogen, sulfo, methyl or methoxy;

$R_8$ is hydrogen, ureido, sulfo, $C_{1-4}$ alkyl, $C_{1-4}$ alkoxyl or $C_{2-4}$ alkanoylamino; preferably, $R_8$ is hydrogen, ureido, sulfo, methyl, methoxy or acetylamino;

V is a amino which is unsubstituted or substituted by non-fiber-reactive radicals;

Q and Q' are each independent of one another denotes —NH—CO—CH(Hal)-$CH_2$(Hal), —NH—CO—C(Hal)=$CH_2$ or —$SO_2$—Y; preferably, Q and Q' are —$SO_2$—Y;

Y is —CH=CH$_2$, —CH$_2$CH$_2$OSO$_3$H or —CH$_2$CH$_2$—U; U is a group which can be eliminated under alkaline conditions;

Hal is halogen; m is an integer of 0 or 1; preferably, m is 1.

In the dye composition of the present invention, the weight percentage of component (B) ranges from 99-1% is a disazo dye of the following formula (III),

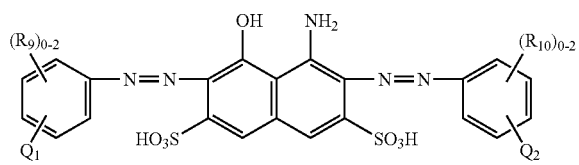

wherein (R$_9$)$_{0-2}$ and (R$_{10}$)$_{0-2}$ are each independently of one another 0 to 2 identical or different radicals selected from the group consisting of sulfo, C$_{1-4}$ alkyl and C$_{1-4}$ alkoxyl; preferably, (R$_9$)$_{0-2}$ and (R$_{10}$)$_{0-2}$ are 0 to 2 identical or different groups selected from sulfo, methyl and methoxy;

Q$_1$ and Q$_2$ are each independently of one another denotes —NH—CO—CH(Hal)-CH$_2$(Hal), —NH—CO—C(Hal)=CH$_2$ or —SO$_2$—Y; preferably, Q$_1$ and Q$_2$ are —SO$_2$—Y;

Y is —CH=CH$_2$, —CH$_2$CH$_2$OSO$_3$H or —CH$_2$CH$_2$—U; U is a group which can be eliminated under alkaline conditions; Hal is Halogen.

If Y is —CH$_2$CH$_2$—U, then U can be as follows:
—Cl, —Br, —F, —SSO$_3$H, —OCO—CH$_3$, —OPO$_3$H$_2$, —OCO—C$_6$H$_5$, —OSO$_2$—C$_{1-4}$ alkyl, —OSO$_2$—N(C$_{1-4}$ alkyl)$_2$ or

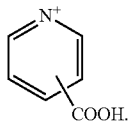

The amino which is unsubstituted or substituted by non-fiber-reactive radicals, V can be as follows:
amino, methylamino, ethylamino, β-sulfoethylamino, o-sulfoaniline, m-sulfoaniline, p-sulfoaniline, 2,4-disulfoaniline, 2,5-disulfoaniline, 1-sulfo-2-naphthylamino, 1,5-disulfo-2-naphthylamino or morpholino.

The dye composition of the present invention can further comprise as a dye composition having dyestuffs of formula (I), formula (II) and formula (III) at the same time. Wherein the said component (A) includes formula (I) is present in an amount ranging from 10-40% by weight relative to total weight of the composition and formula (II) is present in an amount ranging from 1-20% by weight relative to total weight of the composition. The said component (B) is the formula (III) is present in an amount ranging from 40-89% by weight relative to total weight of the composition.

The dye composition of the present invention can be presented in the form of acids or salts, particularly alkaline metallic salt and alkaline-earth metallic salt, application wise preferably is in the form of alkaline metallic salt.

The dye composition of the present invention is suitable for dyeing and printing of materials containing either cellulose fibers, such as cotton, artificial cotton, linen, and artificial linen, or polyamide fibers, such as wool, silk, and nylon etc. Dyed materials with excellent properties can be obtained, showing especially outstanding performance in build-up, wash off, low nylon stain, and light fastness, and can be used with other dyestuffs as well.

DETAILED DESCRIPTION OF THE PREFERRED EMBODIMENT

The compound of formula (I) of the present invention can be prepared as follows.

Firstly, the amino compound of formula (a) undergoes diazotization, afterward it is then coupled with the amino compound of formula (b) below under acidic pH values such as pH of 1-3 at temperatures of 10-20° C.,

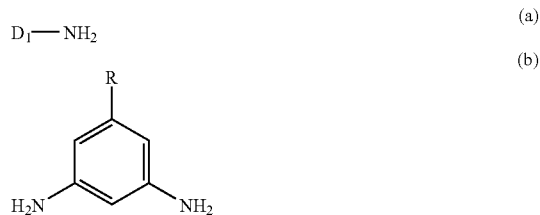

Subsequently the diazonium salt derived from the amine of formula (c)

is coupled with the reaction mixture under acidic to weak acidic pH values such as pH of 2.0 to 5.0 at temperatures of 10~20° C. to obtain a compound of formula (I). Wherein R, D$_1$ and D$_2$ are defined as above.

Preferably the compound of formula (I) is the disazo dye of the following formula (Ia):

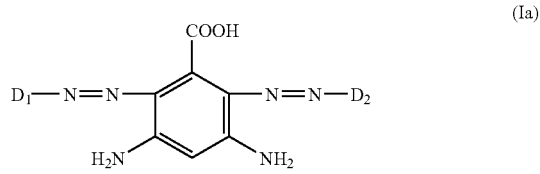

wherein D$_1$ and D$_2$ are defined as above. More preferably it is the disazo dye of formula (Ib):

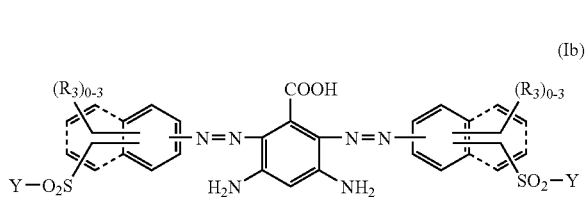

wherein (R$_3$)$_{0-3}$ and Y are defined as above.

Specific examples of formula (I) are formula (2), formula (3), formula (4), formula (5), formula (6) or formula (7):

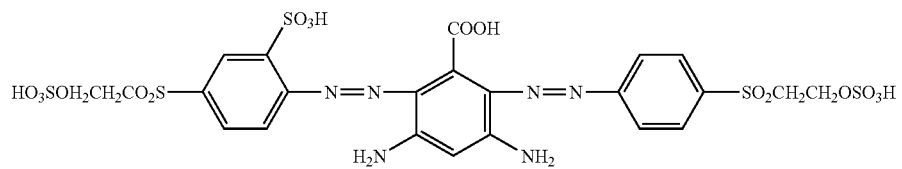
(2)
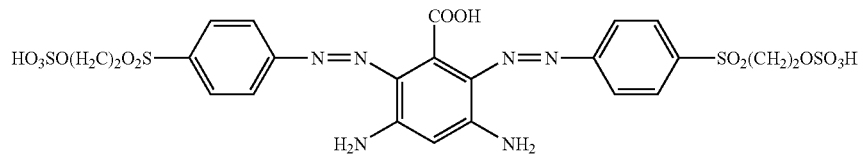
(3)
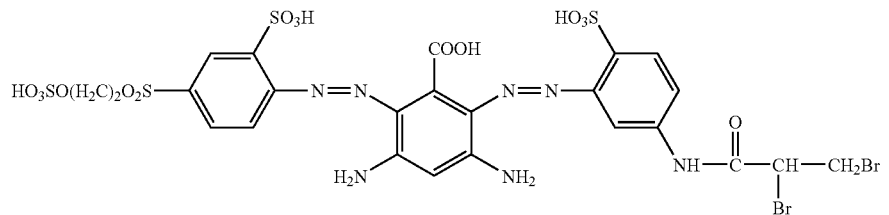
(4)
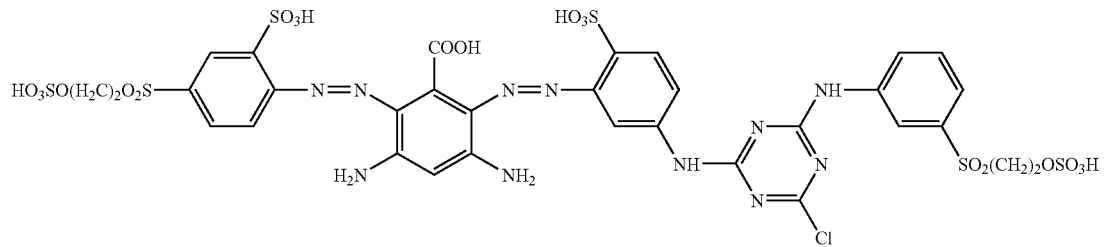
(5)
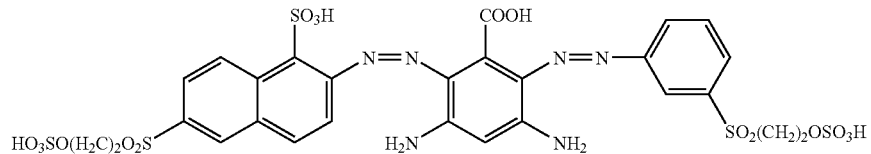
(6)
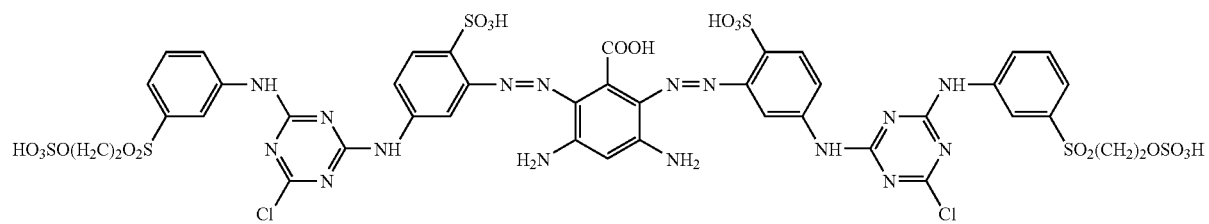
(7)

The synthesis of formula (II) is carried out as follows. Firstly, the amino compound of formula (a) undergoes diazotization, afterward it is then coupled with the amino compound of formula (d) below under acidic to weak acidic pH values such as pH of 1-5 at temperatures of 0-40° C.,

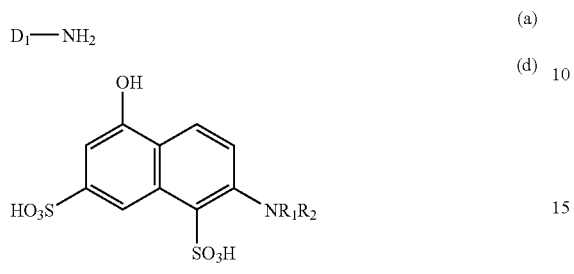

Subsequently the diazonium salt derived from the amine of formula (c),

is coupled with the reaction mixture under weak acidic to alkaline pH values such as pH of 4.0 to 8.0 at temperatures of 20~60° C. to obtain compound of formula (II) of the present invention. Wherein $R_1$, $R_2$, $D_1$ and $D_2$ are defined as above.

Preferably the compound of formula (II) is the disazo dye of formula (IIa):

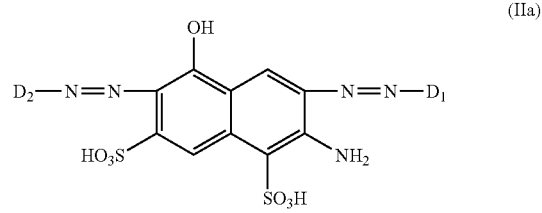

wherein $D_1$ and $D_2$ are defined as above. More preferably it is the disazo dye of formula (IIb):

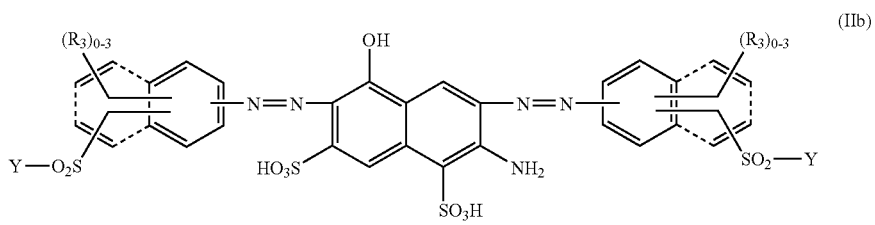

wherein $(R_3)_{0-3}$ and Y are defined as above.

Specific examples of formula (II) are formula (8), formula (9), formula (10), formula (11), formula (12), formula (13) or formula (14):

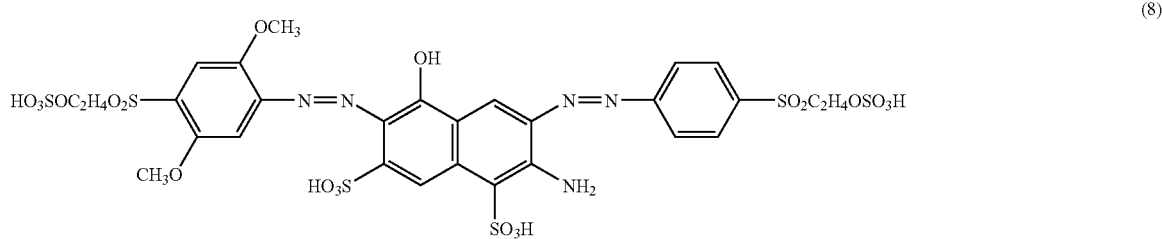

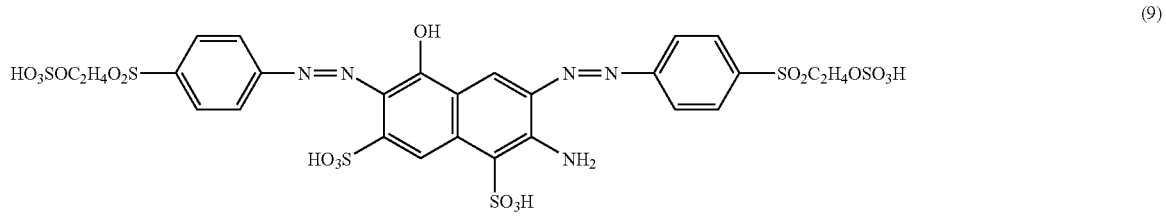

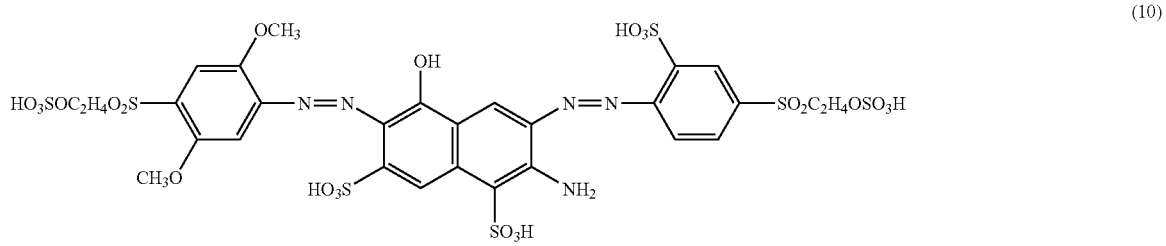

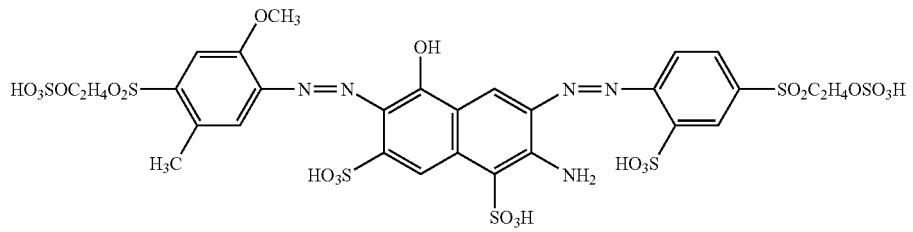

(11)

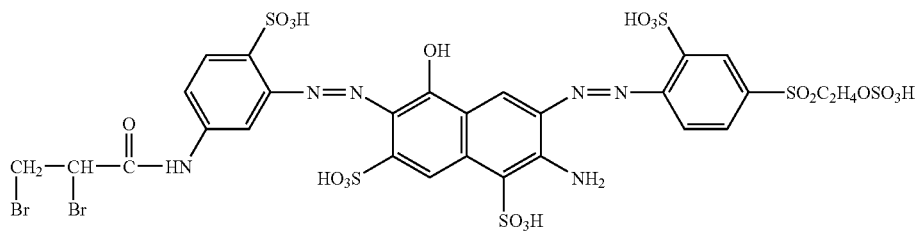

(12)

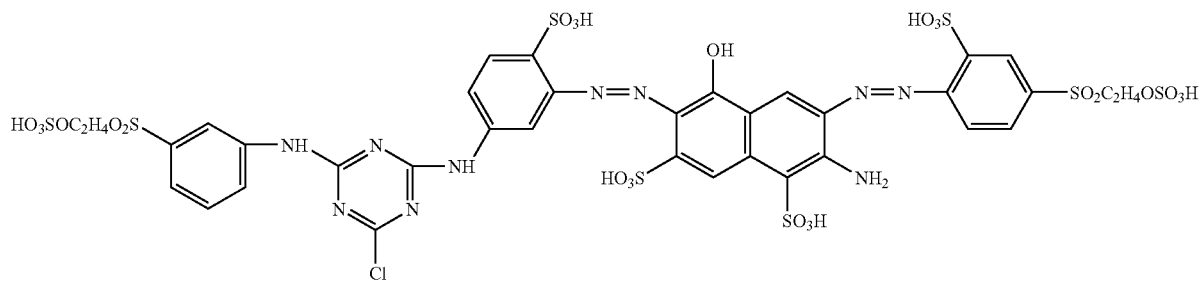

(13)

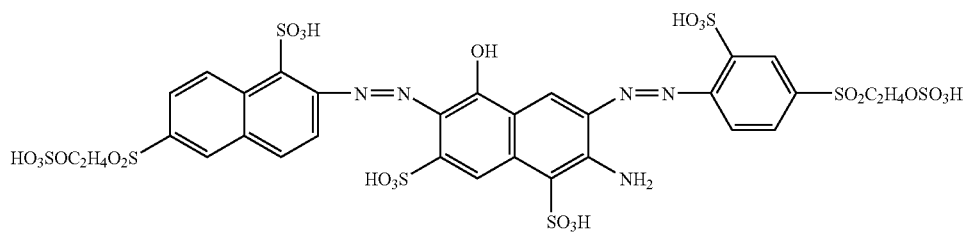

(14)

The synthesis of formula (III) is carried out as follows. Firstly, the amino compound of formula (e) undergoes diazotization, afterward it is then coupled with the amino compound of formula (f) below under acidic pH values such as pH of 1-3 at temperatures of 10-20° C., Subsequently the diazonium salt derived from the amine of formula (g) is coupled with the reaction mixture under acidic to neutral pH values such as pH of 3.0 to 7.0 at temperatures of 10~20° C., the compound of formula (III) is obtained,

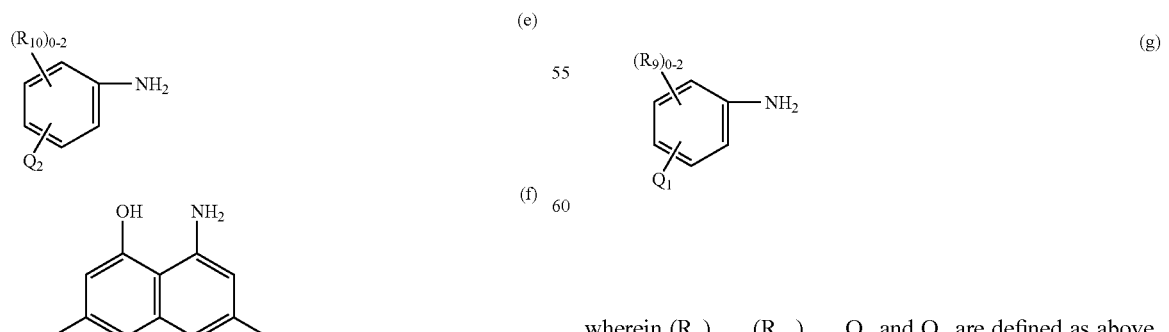

wherein $(R_9)_{0\sim2}$, $(R_{10})_{0\sim2}$, $Q_1$ and $Q_2$ are defined as above. Preferably the compound of formula (III) is the disazo dye of formula (IIIa):

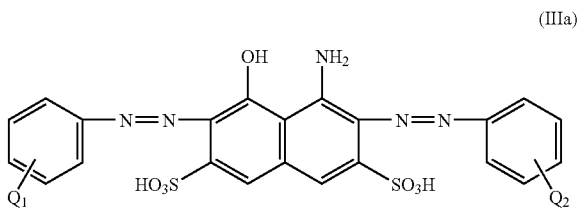

(IIIa)

wherein $Q_1$ and $Q_2$ are defined as above. More preferably it is the disazo dye of formula (IIIb):

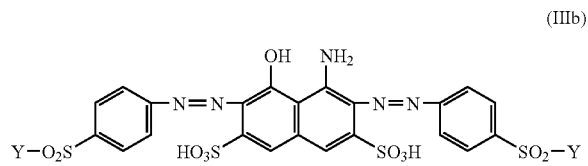

(IIIb)

wherein Y is defined as above.

Specific example of formula (III) is formula (15):

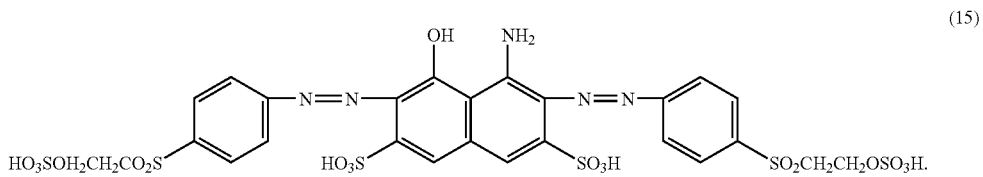

(15)

With the total weight of the dye compositions of the present invention, the component (A) is present in an amount ranging from 1% to 99% by weight relative to total weight of the composition, and the component (B) is present in an amount ranging from 99% to 1% by weight relative to total weight of the composition. Preferably the component (A) is present in an amount ranging from 5% to 95% by weight relative to total weight of the composition, and the component (B) is present in an amount ranging from 95% to 5% by weight relative to total weight of the composition. More preferably the component (A) is present in an amount ranging from 10% to 90% by weight relative to total weight of the composition, and the component (B) is present in an amount ranging from 90% to 10% by weight relative to total weight of the composition.

The composition of the present invention can be further expressed as a composition comprising the formula (I), the formula (II) and the formula (III) at the same time. With the total weight of the dye compositions, wherein the said component (A) includes the formula (I) present in an amount ranging from 10% to 40% by weight relative to total weight of the composition and the formula (II) present in an amount ranging from 1% to 20% by weight relative to total weight of the composition. The said component (B) is the formula (III) present in an amount ranging from 40% to 89% by weight relative to total weight of the composition. Preferably the said component (A) includes the formula (I) present in an amount ranging from 15% to 40% by weight relative to total weight of the composition and the formula (II) present in an amount ranging form 5% to 20% by weight relative to total weight of the composition, the said component (B) is formula (III) present in an amount ranging from 40% to 80% by weight relative to total weight of the composition.

The compositions of the present invention can be prepared in several ways. For example, the dye components can be prepared separately and then mixed together to make powder, granular and liquid forms, or a number of individual dyes may be mixed according to the dyeing recipes in a dyehouse. The dye mixtures of the present invention can be prepared, for example, by mixing the individual dyes. The mixing process is carried out, for example, in a suitable mill, such as a ball mill or a pin mill, or kneaders or mixers.

If necessary, the dye composition of the present invention may contain inorganic salts (e.g. sodium chloride, potassium chloride and sodium sulfate), dispersants (e.g. β-naphthalenesulfonic acid-formaldehyde condensation products, methylnaphthalenesulfonic acid-formaldehyde condensation products, acetylaminonaphthol based compounds, etc.), non-dusting agents (e.g. di-2-ethylhexyl terephthalate, etc.), pH buffering agents (e.g. sodium acetate, sodium phosphate, etc.), water softeners (e.g. polyphosphate, etc.), well-known dyeing assistants, etc.

The form of the dye composition of the present invention is not critical. The dye composition can be powders, granules or liquids form.

For the convenience of description, the compounds are depicted as free acids in the specification. When the dyestuffs of the present invention are manufactured, purified or used, they exist in the form of water soluble salts, especially alkaline metallic salts, such as sodium salts, lithium salts, potassium salts or ammonium salts, and preferably sodium salts.

The dye compositions of the present invention can be used to dye a wide range of fiber materials, especially for cellulose fiber materials. These dye compositions can also be used to dye natural cellulose fibers and regenerated cellulose fibers, such as cotton, linen, jute, ramie, mucilage rayon, as well as cellulose based fibers.

The dyeing by using the dye compositions of the present invention can be any generally used process. Take exhaustion dyeing for example, it utilizes either inorganic neutral salts such as sodium sulfate anhydride and sodium chloride, or acid chelating agents such as sodium carbonate and sodium hydroxide, or both of them. The amount of inorganic neutral salts or base is not of concern, and can be added once or separately. In addition to that, it is optional to add traditionally used dyeing assistants, such as leveling agents and retarding agents. The temperature of dyeing ranges from 40° C. to 90° C., and preferably 50° C. to 70° C.

A cold batch-up dyeing method firstly carried out pad-dyeing by using inorganic neutral salts such as sodium sulfate anhydride and sodium chloride, and acid chelating agents such as sodium silicate and sodium hydroxide, and then the materials were rolled up to start dyeing.

Continuous dyeing is single batch-up dyeing, which mixes a well-known acid chelating agent such as sodium carbonate or sodium bicarbonate with a pad-dyeing liquor, and pad-dyeing is carried out. After that, the dyed materials are dried or evaporated to fix the color, and then the dyed materials are treated with well-known inorganic neutral salts such as sodium sulfate anhydride and sodium chloride, and acid chelating agents such as sodium hydroxide or sodium silicate. Preferably, the treated materials are dried or evaporated again by common methods to finally fix the color.

Among textile printing methods, a one-way printing method utilizes a printing paste containing an acid chelating agent such as sodium bicarbonate to print the materials, thereafter the printed materials are dried or evaporated to fix the color. However, a two-phase printing method includes printing by printing paste and fixing color by soaking the printed materials in high temperature (90° C. or above) solution containing inorganic neutral salts (like sodium chloride) and acid chelating agents (like sodium hydroxide or sodium silicate). The dyeing methods of the present invention are not restricted to the aforementioned methods.

The dye composition of the present invention has good fixation and excellent build up capacity. Besides, the dye composition exhibits excellent color depth, levelness and wash off properties, as well as high solubility, high exhaustion and high fixation rate. Therefore exhaustion dyeing can be applied under low dyeing temperature and during pad-steaming process only a short steaming time is required for the dye composition. The dyeing results show high fixation yield as well the unfixed regions can be easily washed off, mean while difference between exhaustion yield and fixation yield is small, and only minor unfixed dye losted in cleaning procedure can be detected.

The dyeings and prints produced on cellulose fiber materials with the dyestuffs composition according to the present invention have a good depth of color and a high fiber-dyestuff bonding stability both in the acid and in the alkaline range. Besides, the dyed cellulose fiber materials have excellent properties of light fastness, wet-light fastness, and wet fastness, e.g. wash fastness, water fastness, seawater fastness, cross-dyeing fastness, and perspiration fastness, as well as wrinkling fastness, ironing fastness, and rubbing fastness. Therefore, the present invention is a valuable reactive black dye for cellulose fibers in the present dyeing industry. The dye compositions have the materials dyed with excellent properties and resulting outstanding build-up and light fastness.

Many examples have been used to illustrate the present invention. The examples sited below should not be taken as a limit to the scope of the invention. In these examples, the compounds are represented in the form of dissolved acid. However, in practice, they will exist as alkali salts for mixing and salts for dyeing.

In the following examples, quantities are given as parts by weight (%) if there is no indication. The relationship between weight parts and volume parts are the same as that between kilogram and liter.

PREPARATION EXAMPLE 1

115.6 parts of 1-aminobenzene-2-sulfonic acid-4-β-sulfatoethylsulfone are prepared and dissolved in 1000 parts of ice water, and followed 80 parts of 32% HCL aqueous solution are added and stirred. Subsequently the reacting solution undergoes diazotization by the addition of 27 parts of sodium nitrite aqueous solution under a temperature of 0 to 5° C. To this mixture 48.7 parts of powdered 3,5-diaminobenzoic acid are then added and stirred till coupling reaction has completed. The solution is salted out with NaCl and filtered to obtain compound (P-1).

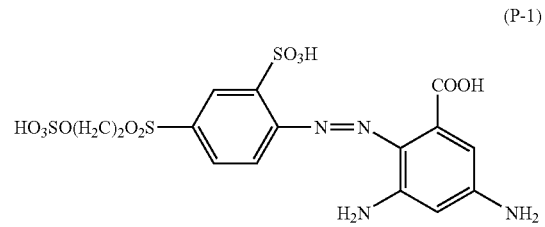

(P-1)

16.8 parts of 1-aminobenzene-4-β-sulfatoethylsulfone are prepared and dissolved in 150 parts of ice water, and followed by stirring in 8 parts of 32% HCl aqueous solution. Subsequently the reacting solution undergoes diazotization by the addition of 4.3 parts of sodium nitrite aqueous solution under a temperature of 0 to 5° C. After that 30.5 parts of compound (P-1) are further mixed with the reacting solution, and the pH is adjusted gradually to 3.5 by the addition of sodium bicarbonate. Under a temperature of 10-15° C. the mixture is stirred till coupling reaction has completed. The solution is salted out with NaCl and filtered to obtain compound (2).

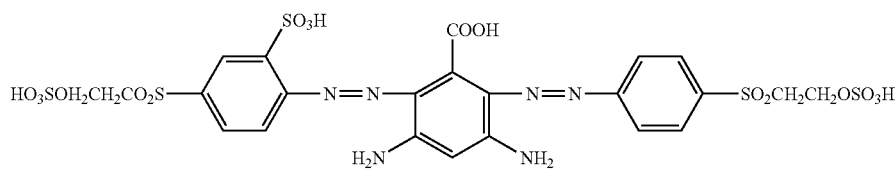

(2)

PREPARATION EXAMPLE 2

33.8 parts of 1-aminobenzene-4-β-sulfatoethylsulfone are prepared and dissolved in 200 parts of ice water, and followed by stirring in 16 parts of 32% HCl aqueous solution. Subsequently the reacting solution undergoes diazotization by the addition of 8.7 parts of sodium nitrite aqueous solution under a temperature of 0 to 5° C. To this mixture 9.1 parts of powdered 3,5-diaminobenzoic acid are then added, and the pH is adjusted gradually to 3.5 by the addition of sodium bicarbonate. Under a temperature of 10-15° C., it is stirred till coupling reaction has completed. The solution is salted out with NaCl and filtered to obtain compound (3).

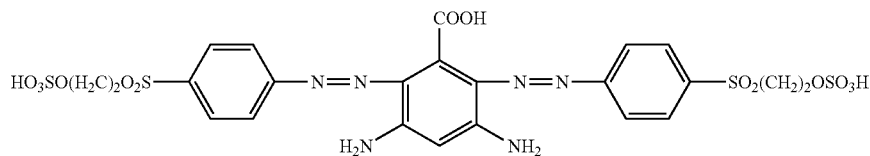

(3)

PREPARATION EXAMPLE 3

4.8 parts of 2-amino-4-((2,3-dibromopropionyl)amino) benzene sulfonic acid are prepared and dissolved in 60 parts of ice water, and is followed by stirring in 3.2 parts of 32% HCl aqueous solution. Subsequently 0.9 parts of sodium nitrite aqueous solution are added and stirred under room temperature till diazotization has completed. After that 6.1 parts of compound (P-1) are further mixed with the reacting solution, the pH is adjusted gradually to 5.0 by the addition of sodium carbonate. Under room temperature the mixture is stirred till coupling reaction has completed. The solution is salted out with NaCl and filtered to obtain compound (4).

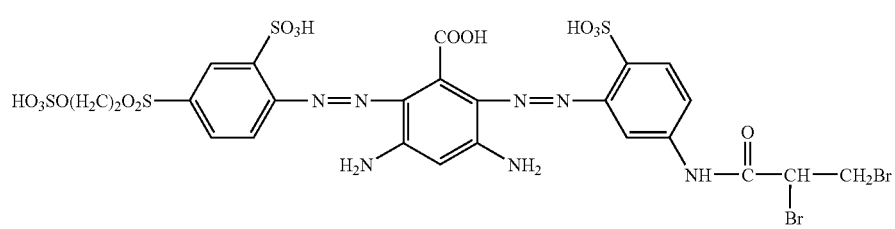

(4)

PREPARATION EXAMPLE 4

19 parts of Cyanic chloride are prepared and dissolved in ice water, and 29 parts of powdered 1-aminobenzene-3-β-sulfatoethylsulfone are further added. The pH of the resulting mixture is adjusted gradually to 3.4-4.0 by the addition of sodium carbonate, afterward the mixture is stirred till condensation reaction has completed. Following condensation reaction, 19.4 parts of powdered 2,4-Diaminobenzenesulfonic acid are added. The pH of the resulting mixture is adjusted gradually to 5.0 by the addition of sodium carbonate, afterward the mixture is stirred till the second condensation reaction has completed. The solution is salted out with KCl along with 32% HCl, and filtered to obtain compound (P-2).

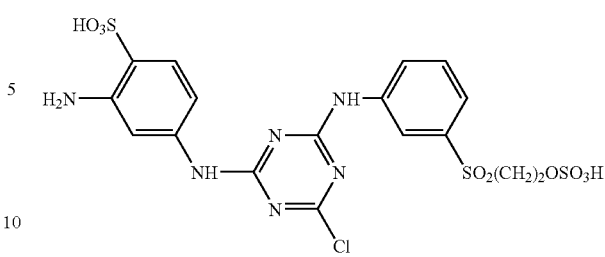
(P-2)

Take ⅓ parts of the aforementioned compound (P-2) and dissolving it in ice water, which were then mixed completely with 2.0 parts of sodium nitrite. Afterward 8.4 parts of 32% HCl aqueous solution are then added and under a temperature of 5-10° C. the reacting solution is stirred till diazotization has completed. Subsequently 14.3 parts of the compound (P-1) are further added, and is followed by adjusting the pH gradually to 3.5-4.0 with the addition of sodium carbonate, and under room temperature the mixture is stirred till coupling reaction has completed. The solution is salted out with NaCl and filtered to obtain compound (5).

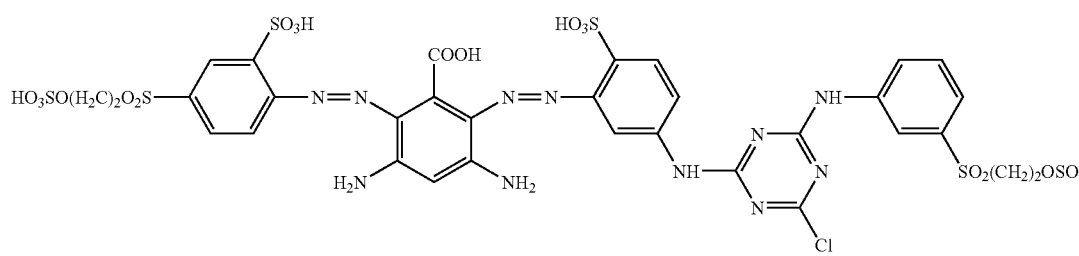
(5)

PREPARATION EXAMPLE 5 to 14

Generally, in accordance with the procedures of the Preparation example 1, 2, 3 and 4, the reactive dyestuffs described below can be prepared, and upon dyeing with specific dyestuffs, dyed cotton fiber demonstrates excellent fastness properties.

PREPARATION EXAMPLE 5

An orange compound of the following formula (6) is obtained.

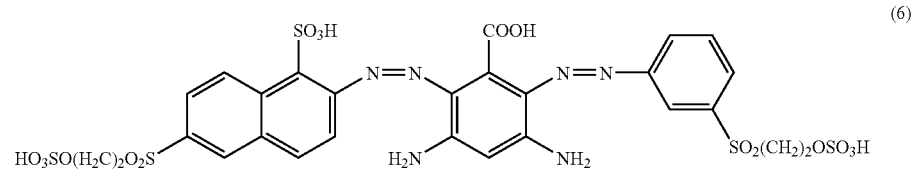
(6)

PREPARATION EXAMPLE 6
An orange compound of the following formula (7) is obtained.
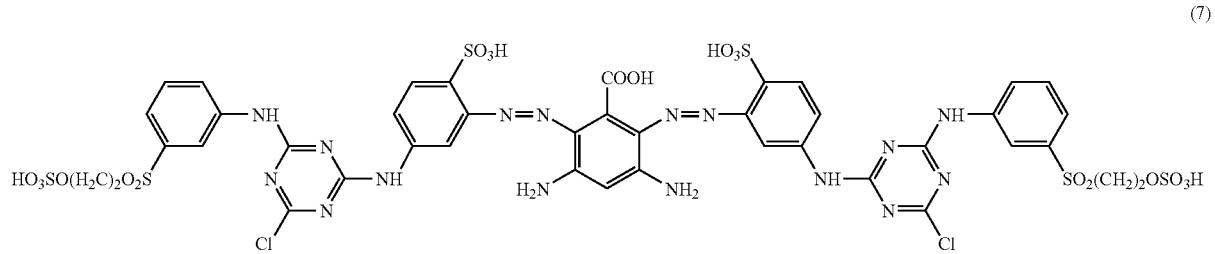
(7)
PREPARATION EXAMPLE 7
A red compound of the following formula (8) is obtained.
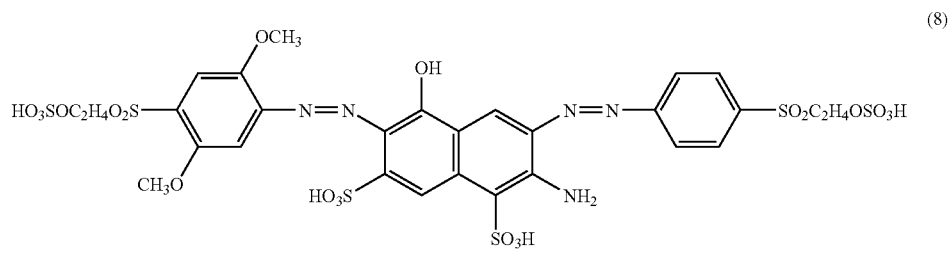
(8)
PREPARATION EXAMPLE 8
A red compound of the following formula (9) is obtained.
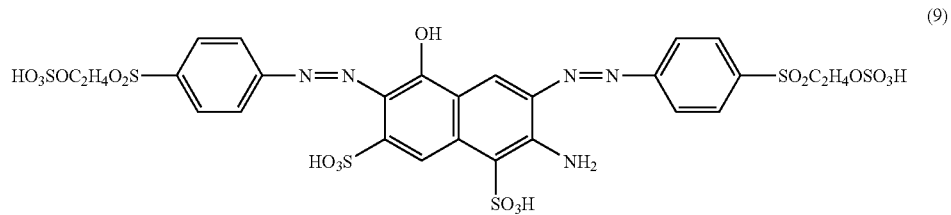
(9)
PREPARATION EXAMPLE 9
A red compound of the following formula (10) is obtained.
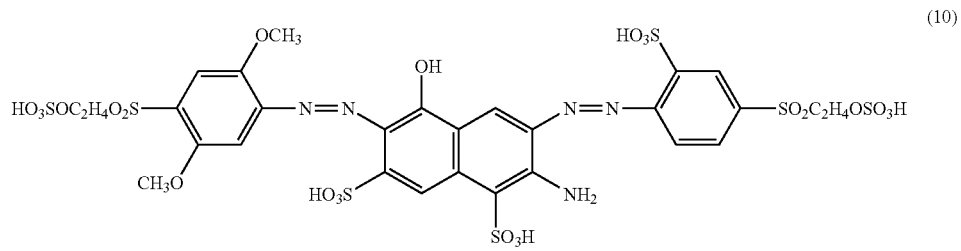
(10)

PREPARATION EXAMPLE 10
A red compound of the following formula (11) is obtained.
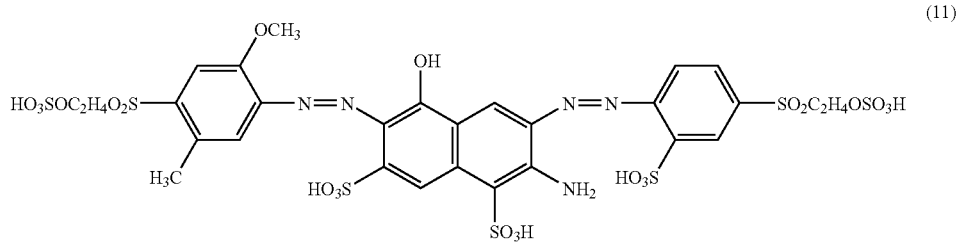
(11)
PREPARATION EXAMPLE 11
A red compound of the following formula (12) is obtained.
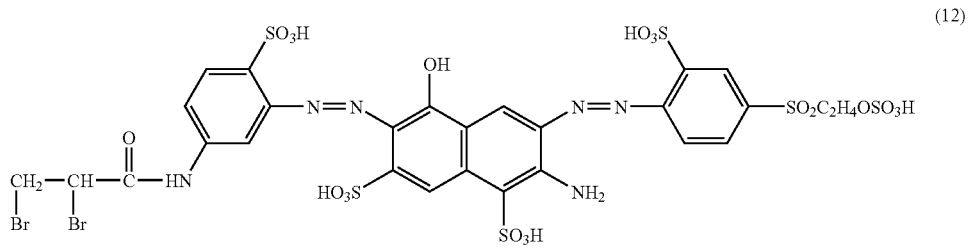
(12)
PREPARATION EXAMPLE 12
A red compound of the following formula (13) is obtained.
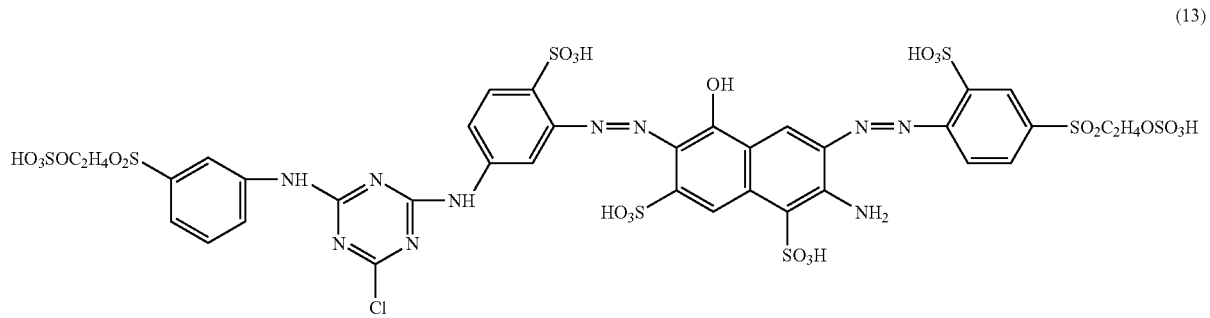
(13)
PREPARATION EXAMPLE 13
A red compound of the following formula (14) is obtained.
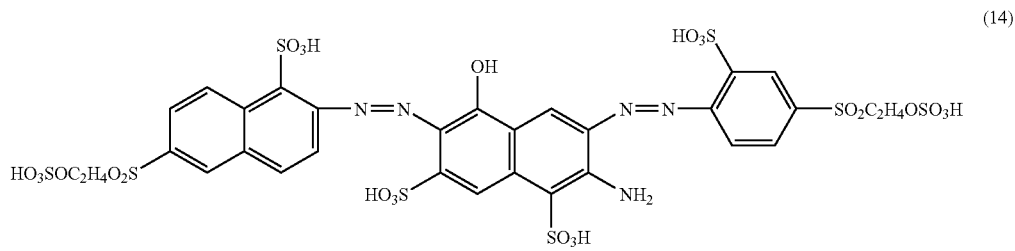
(14)

PREPARATION EXAMPLE 14

An orange compound of the following formula (16) is obtained.

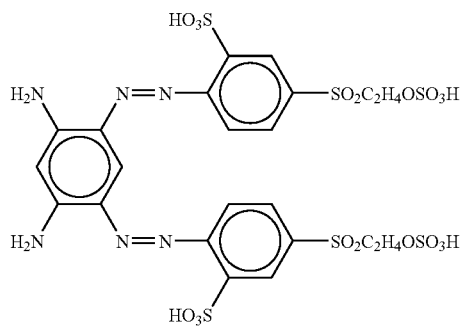

(16)

EXAMPLE 1

Preparing dyestuffs of formula (15) and formula (2) as described above. Take 90 weight parts of formula (15) and 10 weight parts of formula (2) and mixed completely to form a dye composition.

EXAMPLE 2

Preparing dyestuffs of formula (15) and formula (2) as described above. Take 75 weight parts of formula (15) and 25 weight parts of formula (2) and mixed completely to form a dye composition.

EXAMPLE 3

Preparing dyestuffs of formula (15) and formula (2) as described above. Take 60 weight parts of formula (15) and 40 weight parts of formula (2) and mixed completely to form a dye composition.

EXAMPLE 4

Preparing dyestuffs of formula (15) and formula (3) as described above. Take 90 weight parts of formula (15) and 10 weight parts of formula (3) and mixed completely to form a dye composition.

EXAMPLE 5

Preparing dyestuffs of formula (15) and formula (3) as described above. Take 75 weight parts of formula (15) and 25 weight parts of formula (3) and mixed completely to form a dye composition.

EXAMPLE 6

Preparing dyestuffs of formula (15) and formula (3) as described above. Take 60 weight parts of formula (15) and 40 weight parts of formula (3) and mixed completely to form a dye composition.

EXAMPLE 7

Preparing dyestuffs of formula (15) and formula (4) as described above. Take 90 weight parts of formula (15) and 10 weight parts of formula (4) and mixed completely to form a dye composition.

EXAMPLE 8

Preparing dyestuffs of formula (15) and formula (4) as described above. Take 75 weight parts of formula (15) and 25 weight parts of formula (4) and mixed completely to form a dye composition.

EXAMPLE 9

Preparing dyestuffs of formula (15) and formula (4) as described above. Take 60 weight parts of formula (15) and 40 weight parts of formula (4) and mixed completely to form a dye composition.

EXAMPLE 10

Preparing dyestuffs of formula (15) and formula (5) as described above. Take 90 weight parts of formula (15) and 10 weight parts of formula (5) and mixed completely to form a dye composition.

EXAMPLE 11

Preparing dyestuffs of formula (15) and formula (5) as described above. Take 75 weight parts of formula (15) and 25 weight parts of formula (5) and mixed completely to form a dye composition.

EXAMPLE 12

Preparing dyestuffs of formula (15) and formula (5) as described above. Take 60 weight parts of formula (15) and 40 weight parts of formula (5) and mixed completely to form a dye composition.

EXAMPLE 13

Preparing dyestuffs of formula (15) and formula (6) as described above. Take 90 weight parts of formula (15) and 10 weight parts of formula (6) and mixed completely to form a dye composition.

EXAMPLE 14

Preparing dyestuffs of formula (15) and formula (6) as described above. Take 75 weight parts of formula (15) and 25 weight parts of formula (6) and mixed completely to form a dye composition.

EXAMPLE 15

Preparing dyestuffs of formula (15) and formula (6) as described above. Take 60 weight parts of formula (15) and 40 weight parts of formula (6) and mixed completely to form a dye composition.

EXAMPLE 16

Preparing dyestuffs of formula (15) and formula (7) as described above. Take 90 weight parts of formula (15) and 10 weight parts of formula (7) and mixed completely to form a dye composition.

EXAMPLE 17

Preparing dyestuffs of formula (15) and formula (7) as described above. Take 75 weight parts of formula (15) and 25 weight parts of formula (7) and mixed completely to form a dye composition.

EXAMPLE 18

Preparing dyestuffs of formula (15) and formula (7) as described above.

Take 60 weight parts of formula (15) and 40 weight parts of formula (7) and mixed completely to form a dye composition.

EXAMPLE 19

Preparing dyestuffs of formula (15) and formula (8) as described above.

Take 90 weight parts of formula (15) and 10 weight parts of formula (8) and mixed completely to form a dye composition.

EXAMPLE 20

Preparing dyestuffs of formula (15) and formula (8) as described above. Take 75 weight parts of formula (15) and 25 weight parts of formula (8) and mixed completely to form a dye composition.

EXAMPLE 21

Preparing dyestuffs of formula (15) and formula (8) as described above. Take 60 weight parts of formula (15) and 40 weight parts of formula (8) and mixed completely to form a dye composition.

EXAMPLE 22

Preparing dyestuffs of formula (15) and formula (9) as described above. Take 90 weight parts of formula (15) and 10 weight parts of formula (9) and mixed completely to form a dye composition.

EXAMPLE 23

Preparing dyestuffs of formula (15) and formula (9) as described above. Take 75 weight parts of formula (15) and 25 weight parts of formula (9) and mixed completely to form a dye composition.

EXAMPLE 24

Preparing dyestuffs of formula (15) and formula (9) as described above. Take 60 weight parts of formula (15) and 40 weight parts of formula (9) and mixed completely to form a dye composition.

EXAMPLE 25

Preparing dyestuffs of formula (15) and formula (10) as described above. Take 90 weight parts of formula (15) and 10 weight parts of formula (10) and mixed completely to form a dye composition.

EXAMPLE 26

Preparing dyestuffs of formula (15) and formula (10) as described above. Take 75 weight parts of formula (15) and 25 weight parts of formula (10) and mixed completely to form a dye composition.

EXAMPLE 27

Preparing dyestuffs of formula (15) and formula (10) as described above. Take 60 weight parts of formula (15) and 40 weight parts of formula (10) and mixed completely to form a dye composition.

EXAMPLE 28

Preparing dyestuffs of formula (15) and formula (11) as described above. Take 90 weight parts of formula (15) and 10 weight parts of formula (11) and mixed completely to form a dye composition.

EXAMPLE 29

Preparing dyestuffs of formula (15) and formula (11) as described above. Take 75 weight parts of formula (15) and 25 weight parts of formula (11) and mixed completely to form a dye composition.

EXAMPLE 30

Preparing dyestuffs of formula (15) and formula (11) as described above. Take 60 weight parts of formula (15) and 40 weight parts of formula (11) and mixed completely to form a dye composition.

EXAMPLE 31

Preparing dyestuffs of formula (15) and formula (12) as described above. Take 90 weight parts of formula (15) and 10 weight parts of formula (12) and mixed completely to form a dye composition.

EXAMPLE 32

Preparing dyestuffs of formula (15) and formula (12) as described above. Take 75 weight parts of formula (15) and 25 weight parts of formula (12) and mixed completely to form a dye composition.

EXAMPLE 33

Preparing the dyestuffs of formula (15) and formula (12) as described above. Take 60 weight parts of formula (15) and 40 weight parts of formula (12) and mixed completely to form a dye composition.

EXAMPLE 34

Preparing the dyestuffs of formula (15) and formula (13) as described above. Take 90 weight parts of formula (15) and 10 weight parts of formula (13) and mixed completely to form a dye composition.

EXAMPLE 35

Preparing the dyestuffs of formula (15) and formula (13) as described above. Take 75 weight parts of formula (15) and 25 weight parts of formula (13) and mixed completely to form a dye composition.

EXAMPLE 36

Preparing the dyestuffs of formula (15) and formula (13) as described above. Take 60 weight parts of formula (15) and 40 weight parts of formula (13) and mixed completely to form a dye composition.

EXAMPLE 37

Preparing the dyestuffs of formula (15) and formula (14) as described above. Take 90 weight parts of formula (15) and 10 weight parts of formula (14) and mixed completely to form a dye composition.

EXAMPLE 38

Preparing the dyestuffs of formula (15) and formula (14) as described above. Take 75 weight parts of formula (15) and 25 weight parts of formula (14) and mixed completely to form a dye composition.

EXAMPLE 39

Preparing the dyestuffs of formula (15) and formula (14) as described above. Take 60 weight parts of formula (15) and 40 weight parts of formula (14) and mixed completely to form a dye composition.

EXAMPLE 40

Preparing the dyestuffs of formula (15) and formula (16) as described above. Take 90 weight parts of formula (15) and 10 weight parts of formula (16) and mixed completely to form a dye composition.

EXAMPLE 41

Preparing the dyestuffs of formula (15) and formula (16) as described above. Take 75 weight parts of formula (15) and 25 weight parts of formula (16) and mixed completely to form a dye composition.

EXAMPLE 42

Preparing the dyestuffs of formula (15) and formula (16) as described above. Take 60 weight parts of formula (15) and 40 weight parts of formula (16) and mixed completely to form a dye composition.

EXAMPLE 43

Preparing the dyestuff of formula (17) below and dyestuff of formula (2) as described above. Take 90 weight parts of formula (17) and 10 weight parts of formula (2) and mixed completely to form a dye composition.

EXAMPLE 45

Preparing the dyestuffs of formula (17) and formula (8) as described above. Take 90 weight parts of formula (17) and 10 weight parts of formula (8) and mixed completely to form a dye composition.

EXAMPLE 46

Preparing the dyestuffs of formula (18) and formula (8) as described above. Take 90 weight parts of formula (18) and 10 weight parts of formula (8) and mixed completely to form a dye composition.

EXAMPLE 47

Preparing the dyestuffs of formula (15), formula (2), and formula (8) as described above. Take 55 weight parts of formula (15), 35 weight parts of formula (2) and 10 weight parts of formula (8) and mixed completely to form a dye composition.

EXAMPLE 48

Preparing the dyestuffs of formula (15), formula (2), and formula (9) as described above. Take 55 weight parts of formula (15), 35 weight parts of formula (2) and 10 weight parts of formula (9) and mixed completely to form a dye composition.

EXAMPLE 49

Preparing the dyestuffs of formula (15), formula (2), and formula (10) as described above. Take 55 weight parts of formula (15), 35 weight parts of formula (2) and 10 weight parts of formula (10) and mixed completely to form a dye composition.

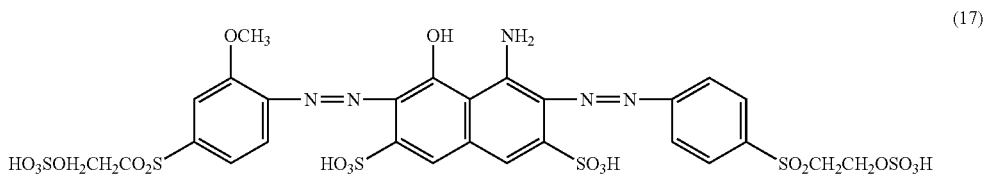

(17)

EXAMPLE 44

Preparing the dyestuff of formula (18) below and dyestuff of formula (2) as described above. Take 90 weight parts of formula (18) and 10 weight parts of formula (2) and mixed completely to form a dye composition.

APPLICATION EXAMPLE 1

Urea 100 parts, reduction retarding agent 10 parts, sodium bicarbonate 20 parts, sodium alginate 55 parts, warm water 815 parts, were stirred in a vessel to give a completely homogeneous printing paste.

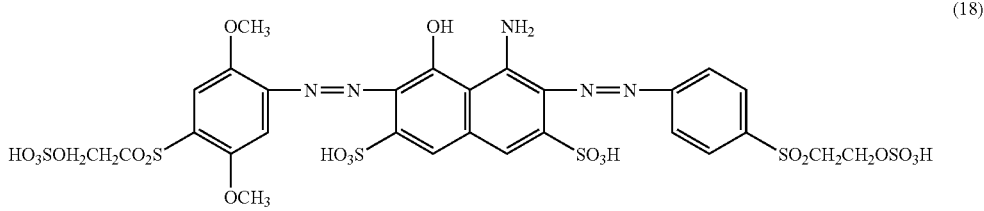

(18)

Dyestuff prepared as in example 1, 3 parts, and the above printing paste, 100 parts, were mixed together to make a homogeneous colored paste. A 100 mesh printing screen covering an adequate sized piece of cotton fabric was painted with this colored paste on printing screen to give a colored fabric.

The colored fabric was placed in an oven at 65° C. to dry for 5 minutes then taken out, and put into a steam oven using saturated steam for 10 minutes at 102-105° C.

The colored fabric was washed with cold water, hot water, and soap then dried to obtain a black fabric with good dyeing properties.

APPLICATION EXAMPLE 2

3 parts of the dyestuff prepared as in example 1 was dissolved in 100 parts of water to give a padding liquor. 25 ml of alkali solution (NaOH (38°Be') 15 ml/l and Glauber's salt 30 parts/1) were added to the padding liquor. The resultant solution was put into a pad roller machine. The cotton fabric was padded by the roller pad machine, then was batched at room temperature for 4 hours. The padded fabric was washed with cold water, hot water, and soap solution then dried to obtain a black fabric with good dyeing properties.

APPLICATION EXAMPLE 3

0.25 parts of the dyestuff as prepared in example 1 was dissolved in 250 parts of water. To 40 ml of this solution, in a dyeing bottle, was added cotton fabric, Glauber's salt, 2.4 parts, and 32% sodium carbonate solution, 2.5 parts. The dyeing bottle was shaken at 60° C. for 60 minutes. The colored fabric was washed with cold water, hot water, and soap solution then dried to obtain a black fabric with good dyeing properties.

APPLICATION EXAMPLE 4

0.25 parts of the dyestuff as prepared in example 2 was dissolved in 250 parts of water. To 40 ml of this solution, in a dyeing bottle, was added cotton fabric, Glauber's salt, 2.4 parts, and 32% sodium carbonate solution, 2.5 parts. The dyeing bottle was shaken at 60° C. for 60 minutes. The colored fabric was washed with cold water, hot water, and soap solution then dried to obtain a black fabric with good dyeing properties.

APPLICATION EXAMPLE 5

0.25 parts of dyestuff prepared as in example 3 was dissolved in 250 parts of water. To 40 ml of this solution, in a dyeing bottle, was added cotton fabric, Glauber's salt, 2.4 parts, and 32% sodium carbonate solution, 2.5 parts.

The dyeing bottle was shaken at 60° C. for 60 minutes. The colored fabric was washed with cold water, hot water, and soap solution then dried to obtain a black fabric with good dyeing properties.

The dye compositions of the present invention are suitable for common uses and have excellent dyeing properties. They can be used to dye cellulose fibers with various dyeing methods, such as exhaustion dyeing, printing-dyeing, or continuous dyeing that are commonly used in reactive dyestuffs.

The dye compositions of the present invention are water-soluble dyestuffs that have a highly commercial value. The dye compositions of the present invention can obtain dyeing results with excellent properties in all aspects, especially in washing off, build-up, levelness, low nylon stain, light fastness, and wet-light fastness.

From the foregoing description, one skilled in the art can easily ascertain the essential characteristics of this invention, and without departing from the scope thereof, one can make various changes and modifications of the invention to adapt it too various usages and conditions. Thus other embodiments are also within the claim.

What is claimed is:

1. A dye composition comprising:
   (A) At least one disazo dye selected from the formula (I) or (II) present in an amount ranging from 1% to 99% by weight,

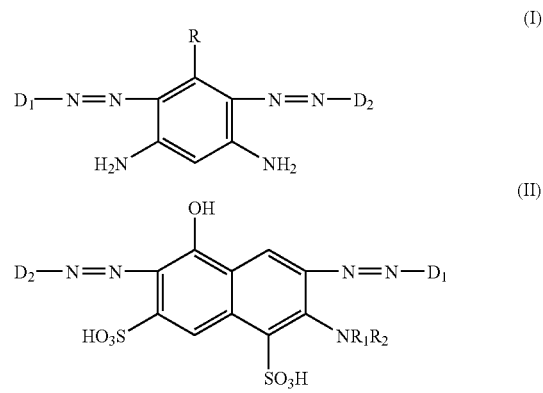

wherein
R is hydrogen or carboxyl;
$R_1$ and $R_2$ are each independently of one another denote hydrogen or $C_{1-4}$ alkyl;
$D_1$ and $D_2$ are each independently can be any group selected from the formulas (1a), (1b), (1c), (1d) or (1e) below

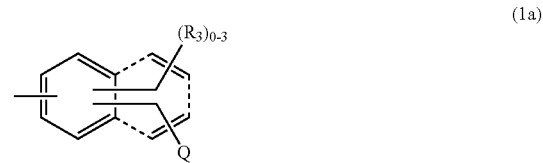

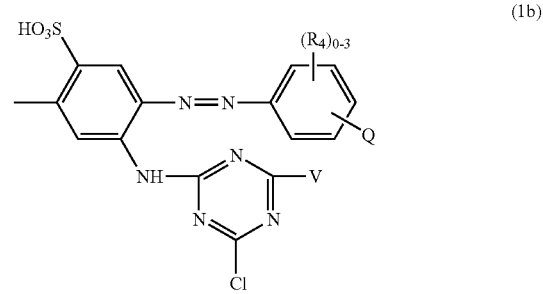

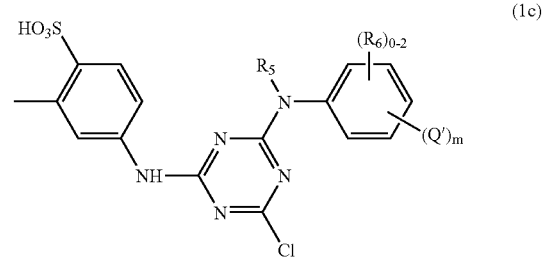

-continued

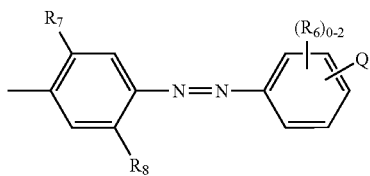

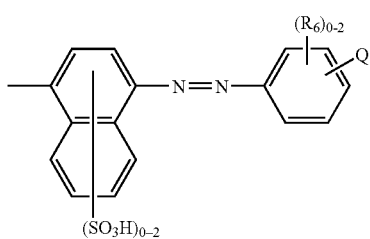

wherein
- $(R_3)_{0-3}$ and $(R_4)_{0-3}$ are each independently of one another 0 to 3 identical or different radicals selected from the group consisting of halogen, carboxyl, sulfo, $C_{1-4}$ alkyl and $C_{1-4}$ alkoxyl;
- $R_5$ is hydrogen or $C_{1-4}$ alkyl which is unsubstituted or substituted by hydroxyl, sulfo, carboxyl or cyano;
- $(R_6)_{0-2}$ is 0 to 2 identical or different radicals selected from the group consisting of sulfo, $C_{1-4}$ alkyl and $C_{1-4}$ alkoxyl;
- $R_7$ is hydrogen, sulfo, $C_{1-4}$ alkyl or $C_{1-4}$ alkoxyl;
- $R_8$ is hydrogen, ureido, sulfo, $C_{1-4}$ alkyl, $C_{1-4}$ alkoxyl or $C_{2-4}$ alkanoylamino;
- V is a amino which is unsubstituted or substituted by non-fiber-reactive radicals;
- Q and Q' are each independently of one another denotes —NH—CO—CH(Hal)-$CH_2$(Hal), —NH—CO—C(Hal)=$CH_2$ or —$SO_2$—Y;
- Y is —CH=$CH_2$, —$CH_2CH_2OSO_3H$ or —$CH_2CH_2$—U;
- U is a group which can be eliminated under alkaline conditions;

Hal is halogen;
m is an integer of 0 or 1; and (B) A disazo dye of formula (III) present in an amount ranging from 99% to 1% by weight,

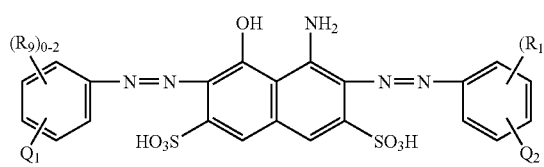

wherein
- $(R_9)_{0-2}$ and $(R_{10})_{0-2}$ are each independently of one another 0 to 2 identical or different radicals selected from the group consisting of sulfo, $C_{1-4}$ alkyl and $C_{1-4}$ alkoxyl;
- $Q_1$ and $Q_2$ are independently of one another denotes -NH-CO-CH(Hal)-$CH_2$(Hal), -NH-CO-C(Hal)=$CH_2$ or —$SO_2$—Y;
- Y is —CH=$CH_2$, —$CH_2CH_2OSO_3H$ or —$CH_2CH_2$—U;
- U is a group which can be eliminated under alkaline conditions;

Hal is Halogen.

2. The dye composition of claim 1, wherein said disazo dye formula (I) or (II) of component (A) the substituent groups $D_1$ and $D_2$ are formula (1a) or (1c).

3. The dye composition of claim 1, wherein the formula (I) is the formula (Ia):

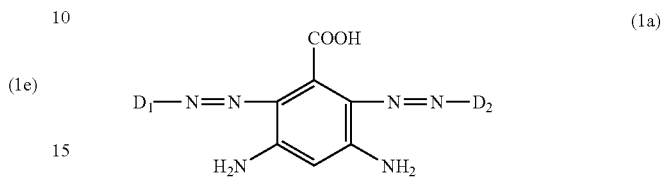

wherein $D_1$ and $D_2$ are defined the same as claim 1.

4. The dye composition of claim 1, wherein the formula (II) is the formula (IIa):

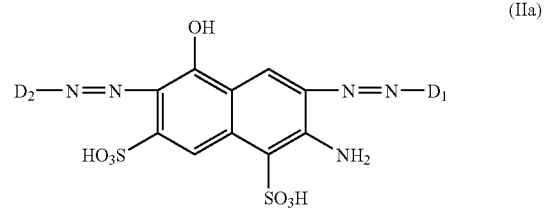

wherein $D_1$ and $D_2$ are defined the same as claim 1.

5. The dye composition of claim 1, wherein the formula (III) is the formula (IIIa):

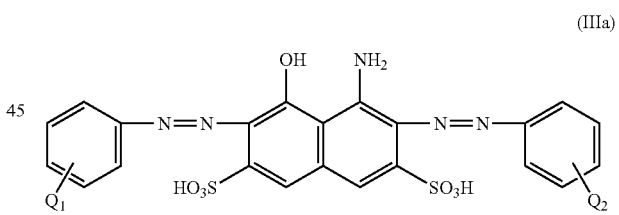

wherein $Q_1$ and $Q_2$ are defined the same as claim 1.

6. The dye composition of claim 1, wherein the formula (I) is the formula (Ib):

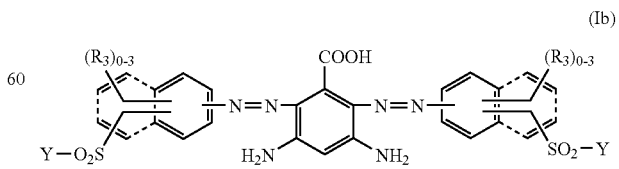

wherein $(R_3)_{0-3}$ and Y are defined the same as claim 1.

7. The dye composition of claim 1, wherein the formula (II) is the formula (IIb):

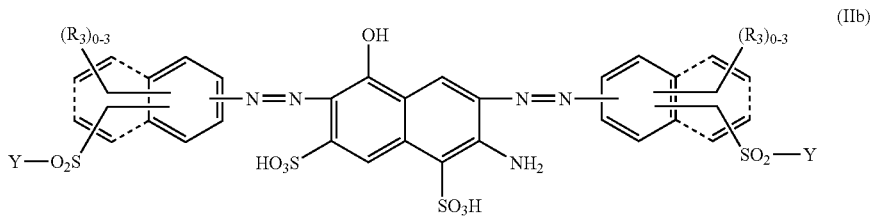

wherein $(R_3)_{0-3}$ and Y are defined the same as claim 1.

8. The dye composition of claim 1, wherein the formula (III) is the formula (IIIb):

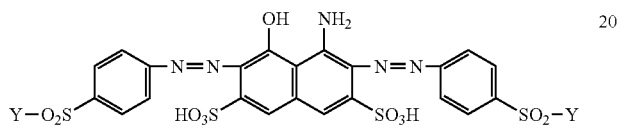

wherein Y is defined the same as claim 1.

9. The dye composition of claim 6, wherein the formula (Ib) is the formula (2).

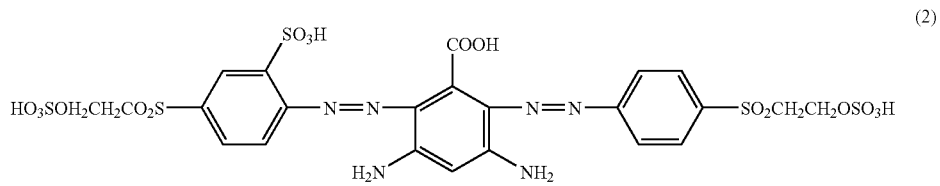

10. The dye composition of claim 6, wherein the formula (Ib) is the formula (3).

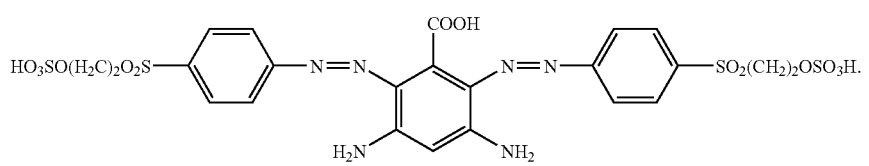

11. The dye composition of claim 7, wherein the formula (IIb) is the formula (8).

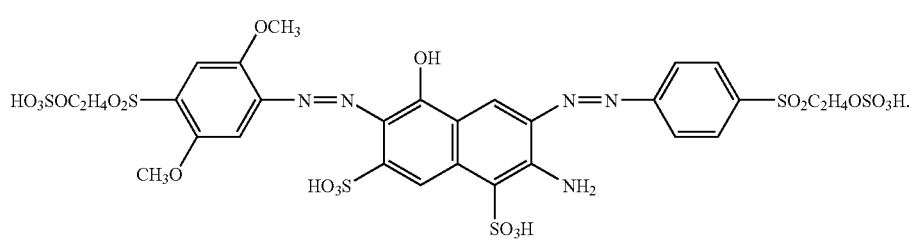

12. The dye composition of claim 7, wherein the formula (IIb) is the formula (9).
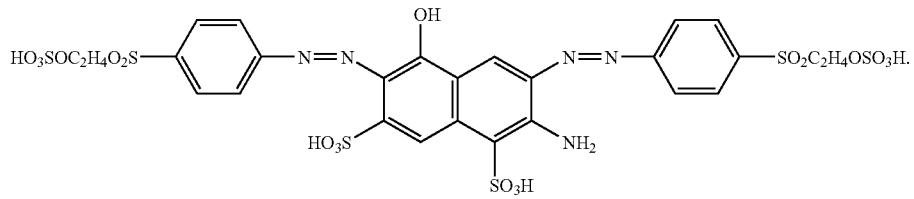
(9)
13. The dye composition of claim 7, wherein the formula (IIb) is the formula (10).
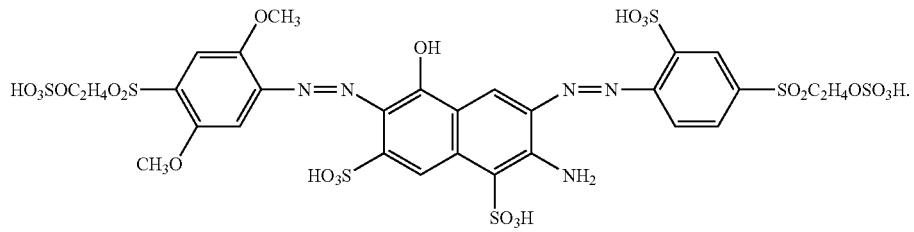
(10)
14. The dye composition of claim 7, wherein the formula (IIb) is the formula (11).
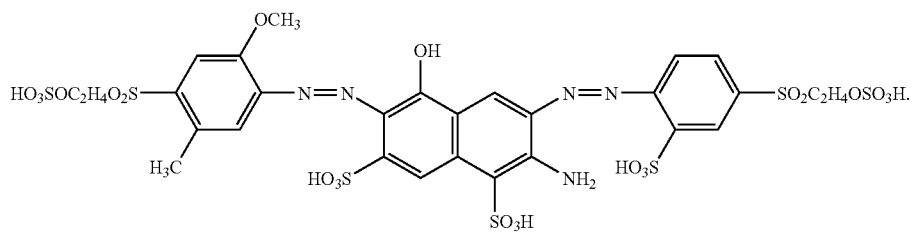
(11)
15. The dye composition of claim 8, wherein the formula (IIIb) is the formula (15).
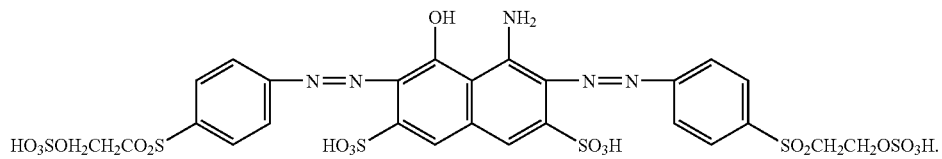
(15)

16. The dye composition of claim 1, wherein the formula (I) is the formula (16).

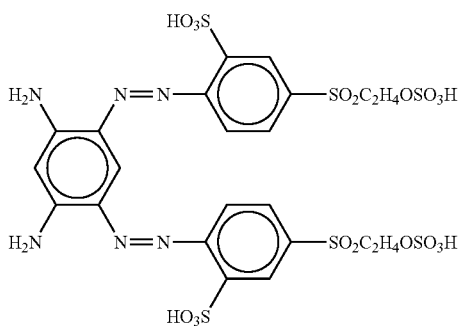

17. The dye composition of claim 1, wherein said component (A) is present in an amount ranging from 5% to 95% by weight relative to total weight of said composition, and said component (B) is present in an amount ranging from 95% to 5% by weight relative to total weight of said composition.

18. The dye composition of claim 1, wherein said component (A) includes formula (I) present in an amount ranging from 10% to 40% by weight relative to total weight of said composition and formula (II) present in an amount ranging form 1% to 20% by weight relative to total weight of said composition, and said component (B) is formula (III) present in an amount ranging from 40% to 89% by weight relative to total weight of said composition.

19. The dye composition of claim 18, wherein said formula (I) is present in an amount ranging from 15% to 40% by weight relative to total weight of said composition, formula (II) is present in an amount ranging from 5% to 20% by weight relative to total weight of said composition, and formula (III) is present in an amount ranging from 40% to 80% by weight relative to total weight of said composition.

* * * * *